Patented Mar. 17, 1942

2,276,267

UNITED STATES PATENT OFFICE 2,276,267

HOMOGENEOUS ALCOHOLIC SOLUTIONS CONTAINING RESINS

Theodore F. Bradley, Stamford, Conn., assignor to American Cyanamid Company, New York, N. Y., a corporation of Maine No Drawing. Application June 22, 1939, Serial No. 280,654

9 Claims. (Cl. 260—16)

This invention relates to alcoholic compositions containing resinous materials having the combined and unique characteristics of oxygen-convertibility and of substantially complete miscibility with an alcohol. It further relates to coating, impregnating and similar compositions containing such resinous materials.

The resinous products which characterize the present invention are of the alkyd type yet they differ from the ordinary alkyds in the particular choice of their constituent acids and alcohols and in their physical properties. Alcohol-soluble alkyds previously described are confined to those which are derived from hydroxy acids, e. g. citric acid, tartaric acid, etc. or high acid number resins derived from other acids. These resins are generally found to be substantially permanently water- and alcohol-soluble except in the case of some of the heat-convertible modifications. Such heat-convertible modifications may also remain water- and alcohol-soluble unless condensed to the infusible stage by very prolonged heating at high temperatures. Such products are not usually oxygen-convertible, are usually quite hygroscopic, are easily softened by water or alcohol, and thus have found little if any commercial application.

Another class of alcohol-soluble alkyd resin has been derived from the ammonium, triethanolamine or alkali metal soaps of the more highly acidic types of the phthalic glycerides or like condensates. It is to be observed that these alkyds are in themselves insoluble in water and alcohol and require combination with alkali to effect miscibility with alcohol. Such alkyds are, therefore, not strictly alcohol-soluble.

It is obvious that the combination of alcohol-solubility and oxygen-convertibility constitutes a desirable commercial objective and attempts have been made to combine these features in one and the same resin. The method which has been suggested as practical for inducing oxygen-convertibility is to incorporate the unsaturated fatty acids of the natural drying oils into the alkyd complex and attempts have been made to combine such fatty acids in alcohol- or alkali-soluble resins of the aforesaid types. It was found, however, that the amounts of such acids which were capable of successful incorporation in the aforesaid resins were decidedly limited since these acids impaired the solubility in alcohol proportionate to the amounts used. Therefore, when more than a minor percentage of fatty acids was introduced, the resulting products only gave emulsions or sometimes even products which could not be properly dispersed.

One object of this invention is to produce alcoholic compositions containing resinous or viscous balsamic substances which are miscible with alcohol and which are suitable for use as plasticizing, softening or flexibilizing agents for shellac, nitrocellulose and similar film-forming agents and for such other purposes as will be described.

It is a further object of the invention to provide alcohol-soluble resins or viscous liquids which are capable of reacting with oxygen to yield useful coatings or impregnants convertible to substantially infusible and insoluble form.

It is a still further object to prepare alcoholic compositions having extensive commercial application.

I have found that these and other objects are attained by reacting, under suitably regulated conditions, an alpha, beta unsaturated polycarboxylic acid with a polyhydric alcohol containing at least three ether (—C—O—C—) linkages and having not over three hydroxyl groups, and dissolving such reaction products in alcoholic compositions. These resinous reaction products are capable of reacting with oxygen to yield useful materials of substantially infusible and insoluble nature. These products are compatible with compositions containing a low molecular weight alcohol, particularly a water-miscible alcohol and if necessary a relatively small proportion of water as well as with mixtures containing a substantial proportion of a water-miscible alcohol and if necessary a small proportion of water, together with other substances.

The following examples are given by way of illustration and not in limitation.

Example 1

| | Parts by weight |
|---|---|
| Itaconic acid | 26 |
| Hexaethylene glycol | 63 |

These substances are placed in a reaction vessel provided with suitable means for agitation and are reacted at about 180°–190° C. for about seven to ten hours, preferably under an inert atmosphere such as carbon dioxide. The product which is obtained is an amber-colored, balsam-like polyester having an acid number of about 25. This resin is soluble in water and also in commercial alcohol (90%–95% ethanol).

Example 2

| | Parts by weight |
|---|---|
| Fumaric acid | 116 |
| Dodecaethylene glycol | 526 |

These substances are reacted at about 175°–200° C. for about eight to twelve hours in the same general manner as in Example 1. An amber-colored, viscous polyester resin is obtained having an acid number of about 25. This resin is soluble in water and in commercial alcohol (90%–95% ethanol).

*Example 3*

| | Parts by weight |
|---|---|
| Hexaethylene glycol | 5495 |
| Maleic anhydride | 1936 |

These molecular equivalent proportions are reacted in a partially closed container adapted to permit the free escape of water of esterification. The reaction is carried out at about 210° C. for about two to three hours. A light amber-colored, viscous, balsam-like polyester resin is obtained having an acid number of about 20–45. This resin is soluble in water, methyl alcohol, commercial ethyl alcohol (90%–95% ethanol), iso-propanol (containing about 12% water), n-butanol (containing about 9% water), tertiary butanol (containing about 10% water), "Cellosolve," dioxane, ethyl acetate, benzyl alcohol, cyclohexanone, benzene, "Butyl Carbitol" acetate and acetone.

*Example 4*

| | Parts by weight |
|---|---|
| Hexaethylene glycol | 63 |
| Monochlor maleic anhydride | 26 |

These substances are reacted in the same general manner as described in Example 1, at about 160°–190° C. for about five to six hours. A reddish brown, viscous, balsam-like polyester resin is obtained having an acid number of about 16. This resin is soluble in alcohol (90% ethanol, 10% water) and is also miscible with small quantities of anhydrous ethanol.

*Example 5*

| | Per cent |
|---|---|
| Shellac (preferably dewaxed) | 85–95 |
| Hexaethylene glycol maleate resin (Example 3) | 15– 5 |

These substances are dissolved in sufficient 90%–95% ethyl alcohol to give the desired concentration of solids, e. g. 30 parts by weight of the above mixture to 70 parts by weight of alcohol. Such compositions give hard, flexible films when air dried.

*Example 6*

| | Per cent |
|---|---|
| Shellac (preferably dewaxed) | 50–90 |
| Hexaethylene glycol maleate resin (Example 3) | 50–10 |

These substances are dissolved in 90%–95% ethyl alcohol as in Example 5 and such compositions are suitable for forming films to be baked. Baking films of these compositions at about 120°–140° C. for about fifteen to sixty minutes yields hard, flexible coatings.

*Example 7*

| | Per cent |
|---|---|
| Spirit soluble ½ second nitrocellulose | 25–90 |
| Hexaethylene glycol maleate resin (Example 3) | 75–10 |

This mixture is dissolved in sufficient solvent material to give the desired viscosity. Among the suitable solvent compositions the following are included, the proportions being given in parts by weight:

| 95% ethanol | "Cellosolve" | Ethyl acetate | Butyl acetate | Toluene |
|---|---|---|---|---|
| 10 | | 6 | 1 | |
| 10 | 12 | | | 6 |
| 5 | 5 | 1 | | 4 |

Films from compositions such as these are very flexible as well as hard. They also dry rapidly and the curing properties of the resin give them better heat resistance and solvent resistance than the ordinary nitrocellulose plasticizers. Other grades of nitrocellulose may be substituted for that used above provided adequate proportions of nitrocellulose solvents are employed.

Other resins which may be substituted in the examples set forth above include those resins mentioned in my Patent No. 2,166,542, patented July 18, 1939, and entitled "Oxygen-Convertible Compositions." Among these are hexaethylene glycol maleate, hexaethylene glycol fumarate, the maleic resinous ester of the trihydric ether-alcohol derived from glycerol and ethylene oxide and the maleic and fumaric esters of other polyethylene glycols such as tetraethylene glycol, pentaethylene glycol, heptaethylene glycol, octaethylene glycol, etc. Obviously mixtures of the polyethylene glycols may be used in forming suitable polyester resins with alpha, beta unsaturated polycarboxylic acids. Itaconic acid resinous esters of any of the glycols mentioned above are particularly suitable as well as the maleic and fumaric esters although other alpha, beta-unsaturated polycarboxylic acids may be used. The term "acid" is used herein to designate either the acid itself or the anhydride inasmuch as either may be used according to convenience and availability.

The alcohols suitable for use according to my invention are the low molecular weight alcohols and more particularly those which are miscible with at least a small proportion of water. The completely water-miscible alcohols are preferred. Examples of suitable alcohols are methanol, ethanol, isopropanol, n-butanol, tertiary butanol, "Cellosolve" (the mono-ethyl ether of ethylene glycol), etc.

A sufficient proportion of water is mixed with the alcohol to render the alcohol compatible with the resin. Usually about 1%–15% of water is suitable. Obviously larger proportions of water may be included in the compositions if desirable and if compatible with the alcohol but generally it is preferable to adjust the concentration of water at the lowest point possible. It is, therefore, preferable that the compositions contain not more than about 10% of water. Certain alcohols such as benzyl alcohol do not require the addition of any water.

The alcoholic compositions containing the resins or balsams described herein are especially suitable for use in coating compositions. These coating compositions dry relatively slowly at room temperature and, therefore, it is generally desirable to bake the coatings at 100°–150° C. for from about a few minutes to about an hour. The time of baking and temperature of baking will vary with film thickness, the resin selected, the presence or absence of drier, etc. It has been found that excellent results are obtained when about 0.02%–0.2% of soluble cobalt or manganese salts are added to the alcoholic solutions of the resin. The addition of drier generally increases the oxygen-conversion to give films more insoluble in alcohol and water and more infusible than those obtained without drier.

The coatings produced from compositions containing the polyethylene-polyhydric alcohol resins are relatively soft and flexible. It is, therefore, often desirable to incorporate shellac into the compositions containing these resins in order to render the coatings harder. At the same time, the undesirable brittleness of the shellac is overcome and the toughness of the coating or the like is improved by the admixture with my oxygen-convertible resins as described herein. Unlike castor oil or other common shellac plasticizers, and present materials do not substantially depress the softening point of the shellac. Furthermore the present materials are miscible with many grades of shellac in all proportions. Best results are usually obtained from compositions containing dewaxed shellac. The more flexible films are obtained from compositions containing relatively high proportions of the polyethylene-polyhydric alcohol resin, e. g., equal parts of shellac and resin. Other alcohol-soluble resins may be used in place of shellac such as manila and elemi resins.

The shellac-resin-alcohol mixtures may be used for cements or adhesives as well as for coating applications. Furthermore, these resins may be fluxed with shellac for modifying the flow and cure properties of shellac molding compositions.

Nitrocellulose lacquers are prepared by dissolving spirit-soluble nitrocellulose in alcohol, together with one or more of the resins described herein. It is usually desirable to add a substantial amount of other nitrocellulose solvents such as ethyl or butyl acetates, "Cellosolve," ethyl lactate, toluene, etc. The resins flexibilize and plasticize the nitrocellulose while the films from nitrocellulose compositions are hard and dry rapidly at normal temperatures. The curing properties of the resin contribute toward better resistance to heat and to solvents than in the case of ordinary resins or plasticizers.

The oxygen conversion may be effected by other means than heating e. g. exposure to ultra-violet radiation or combinations of heat and ultra-violet radiation. Both the ultra-violet and heating treatments are rendered more effective by incorporating an oxidation catalyst in the resin or in its solutions in the form of soluble salts or soluble peroxides e. g. soluble cobalt salts, etc. Catalysts of this nature bring about oxidation of coatings in relatively short periods of time, even in the absence of added heat or light.

The compositions described herein are useful as gasket cements, as spirit varnishes, etc. The compositions which contain shellac are particularly useful for these purposes.

This application is a continuation in part of my application Serial No. 165,485, filed September 24, 1937, and entitled "Oxygen-convertible compositions," this application having matured into Patent No. 2,166,542, patented July 18, 1939.

Obviously many modifications and variations in the processes and compositions described above may be made without departing from the spirit and scope of the invention as defined in the appended claims.

I claim:

1. A composition comprising a homogeneous solution containing a low molecular weight alcohol and an oxygen-convertible ester of a polyhydric alcohol and an alpha, beta unsaturated polycarboxylic acid, said polyhydric alcohol containing at least three ether linkages in the chain separating the OH groups and having not over three hydroxyl groups.

2. A composition comprising a homogeneous solution containing a water-miscible alcohol, at least a relatively small proportion of water and an oxygen-convertible ester of a polyhydric alcohol and an alpha, beta unsaturated polycarboxylic acid, said polyhydric alcohol containing at least three ether linkages in the chain separating the OH groups and having not over three hydroxyl groups, said esters being soluble in the alcohol without the aid of alkaline solubilizing materials.

3. The composition of claim 2 which includes a water-soluble oxidation catalyst.

4. The composition of claim 2 which includes shellac.

5. The composition of claim 2 which includes nitrocellulose.

6. A homogeneous composition comprising an ethyl alcohol solution containing at least a relatively small proportion of water and an oxygen-convertible ester of a polyethylene glycol and maleic acid, said esters being soluble in the alcohol without the aid of alkaline solubilizing materials.

7. A homogeneous composition comprising an ethyl alcohol solution containing at least a relatively small proportion of water and an oxygen-convertible ester of dodecaethylene glycol and an alpha, beta unsaturated polycarboxylic acid.

8. A homogeneous composition comprising an ethyl alcohol solution containing at least a relatively small proportion of water and an oxygen-convertible ester of a polyethylene glycol and itaconic acid, said ester being soluble in the alcohol without the aid of alkaline solubilizing materials.

9. A homogeneous composition comprising an ethyl alcohol solution containing at least a relatively small proportion of water, shellac and an oxygen-convertible ester of hexaethylene glycol and maleic acid.

THEODORE F. BRADLEY.